US012752628B2

(12) United States Patent
Toyoda

(10) Patent No.: US 12,752,628 B2
(45) Date of Patent: Oct. 6, 2026

(54) ELECTRIFIED VEHICLE

(71) Applicant: TOYOTA JIDOSHA KABUSHIKI KAISHA, Toyota (JP)

(72) Inventor: Hiroaki Toyoda, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/200,864

(22) Filed: May 7, 2025

(65) Prior Publication Data

US 2026/0084535 A1 Mar. 26, 2026

(30) Foreign Application Priority Data

Sep. 20, 2024 (JP) ................................ 2024-164006

(51) Int. Cl.
*B60L 3/00* (2019.01)
*B60L 15/00* (2006.01)
*H02M 7/537* (2006.01)

(52) U.S. Cl.
CPC ............. *B60L 3/003* (2013.01); *B60L 15/007* (2013.01); *H02M 7/537* (2013.01)

(58) Field of Classification Search
CPC ...... B60L 3/003; B60L 15/007; H02M 7/537; H02M 7/493; H02M 1/32; H02M 1/325; H02M 7/53871; H02M 7/797; Y02T 10/72
See application file for complete search history.

(56) References Cited

U.S. PATENT DOCUMENTS

2023/0261604 A1* 8/2023 Saha ..................... H02M 1/325 318/801

FOREIGN PATENT DOCUMENTS

CN 208904916 U * 5/2019
JP 2018-014829 A 1/2018

OTHER PUBLICATIONS

English translation of Su et al. (CN 208904916 (Year: 2019).*

* cited by examiner

*Primary Examiner* — Kyle J Kingsland
(74) *Attorney, Agent, or Firm* — SoraIP, Inc.

(57) ABSTRACT

An electrified vehicle includes: an energy storage device; a traction motor including a three-phase open-end winding; a first inverter including a first upper arm and a first lower arm and connected to a first end of the three-phase open-end winding; a second inverter including a second upper arm and a second lower arm and connected to a second end of the three-phase open-end winding; a switch provided between the first and second inverters; and a controller configured to control the first and second inverters and the switch. When the controller confirms that the absolute value of a zero-sequence current is equal to or larger than a threshold while the switch is on and the first and second inverters are being driven to perform switching, the controller determines that the switch has failed open.

3 Claims, 4 Drawing Sheets

ELECTRIFIED VEHICLE

CROSS-REFERENCE TO RELATED APPLICATION

This application claims priority to Japanese Patent Application No. 2024-164006 filed on Sep. 20, 2024. The disclosure of the above-identified application, including the specification, drawings, and claims, is incorporated by reference herein in its entirety.

BACKGROUND

1. Technical Field

The present disclosure relates to electrified vehicles.

2. Description of Related Art

There has been proposed an electrified vehicle including an energy storage device, a traction motor, a first inverter, a second inverter, and a switch (see, for example, Japanese Unexamined Patent Application Publication No. 2018-14829 (JP 2018-14829 A)). In this electrified vehicle, the traction motor includes a three-phase open-end winding. The first inverter includes a first upper arm and a first lower arm. The first inverter is connected to a power line to which the energy storage device is connected, and is also connected to a first end of the three-phase open-end winding. The second inverter includes a second upper arm and a second lower arm. The second inverter is connected to the power line at a position on the opposite side of the first inverter from the energy storage device, and is also connected to a second end of the three-phase open-end winding. The switch is provided on the power line at a position between the first and second inverter.

SUMMARY

In the above electrified vehicle, when the switch has failed open while the switch is on and the motor is running with the first and second inverters being driven to perform switching, energy on the second inverter side can no longer be returned to the energy storage device. As a result, the voltage on the second inverter side may become relatively high. Accordingly, there is a demand for a method for detecting such a failed open condition of a switch.

A primary object of an electrified vehicle of the present disclosure is to allow detection of a failed open condition of a switch.

In order to achieve this primary object, the electrified vehicle of the present disclosure adopts the following measures.

The electrified vehicle of the present disclosure includes an energy storage device,
- a traction motor including a three-phase open-end winding,
- a first inverter including a first upper arm and a first lower arm, connected to a power line to which the energy storage device is connected, and connected to a first end of the three-phase open-end winding,
- a second inverter including a second upper arm and a second lower arm, connected to the power line at a position on the opposite side of the first inverter from the energy storage device, and connected to a second end of the three-phase open-end winding,
- a switch provided on the power line at a position between the first inverter and the second inverter, and
- a controller configured to control the first inverter, the second inverter, and the switch.

The controller is configured to determine that the switch has failed open, when the controller confirms that the absolute value of a zero-sequence current is equal to or greater than a threshold while the switch is on and the first inverter and the second inverter are being driven to perform switching. The zero-sequence current is the sum of phase currents of three phases.

In the electrified vehicle of the present disclosure, the controller is configured to determine that the switch has failed open, when the controller confirms that the absolute value of the zero-sequence current, namely the absolute value of the sum of the phase currents of the three phases, is equal to or greater than the threshold while the switch is on and the first inverter and the second inverter are being driven to perform switching. When the switch has failed open, a current no longer flows through this portion. Therefore, the absolute value of the zero-sequence current may become relatively large. The inventors confirmed this by experiments, analyses, etc. It is therefore possible to detect such a failed open condition of the switch by this method.

In the electrified vehicle of the present disclosure, the controller may be configured to, when the controller determines that the switch has failed open, turn on one of the second upper arm and the second lower arm, turn off the other, and drive the first inverter to cause the first inverter to perform the switching.

In the electrified vehicle of the present disclosure, the switch may include a cathode switch and an anode switch. The cathode switch may be provided on a cathode line of the power line at a position between the first inverter and the second inverter. The anode switch may be provided on an anode line of the power line at a position between the first inverter and the second inverter.

The controller may be configured to, when the controller determines that the switch has failed open, determine, based on the sign of the zero-sequence current, which of the cathode switch and the anode switch has failed open.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
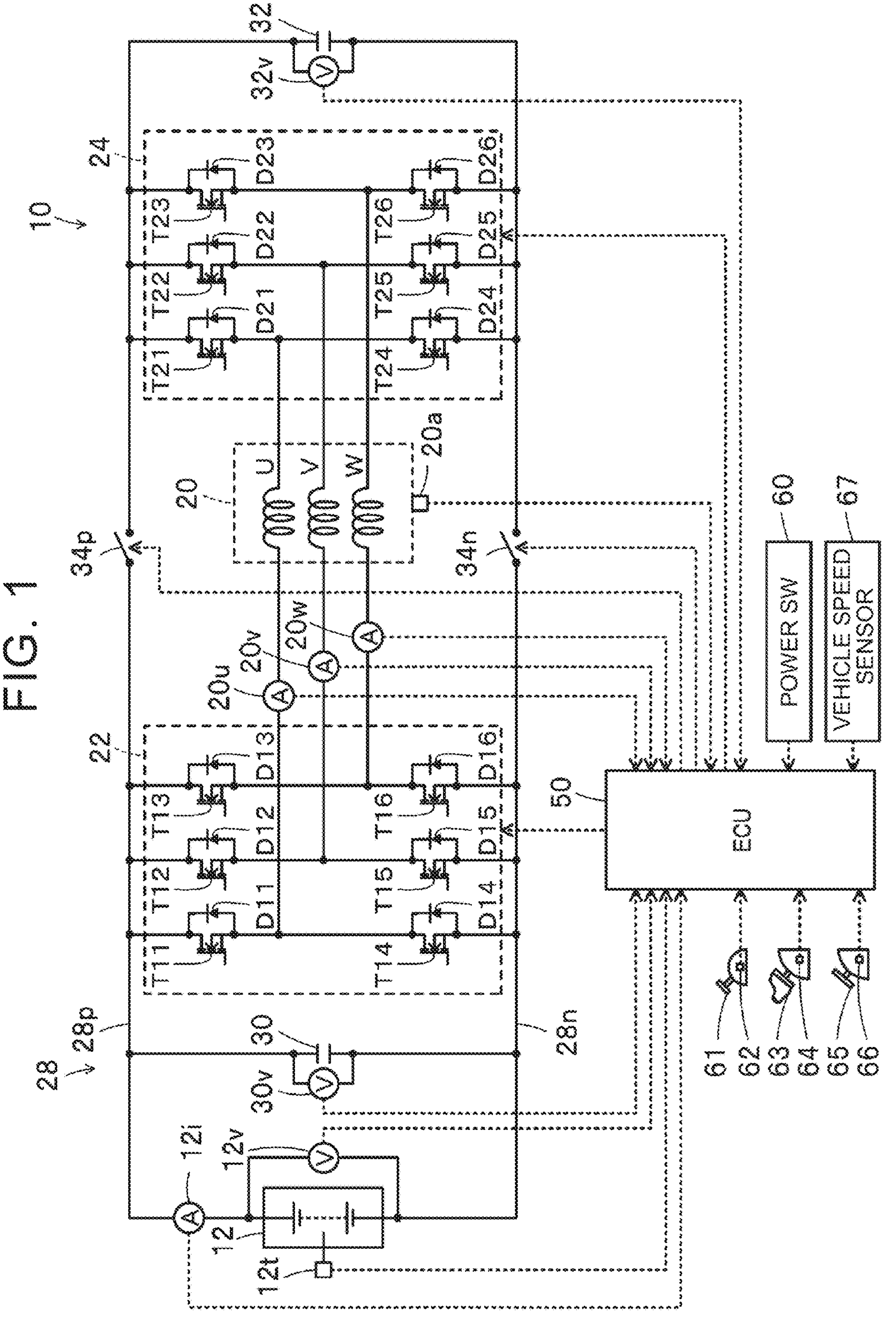
FIG. 1 is a schematic configuration diagram of a battery electric vehicle according to an embodiment of the present disclosure.

Embodiments for carrying out the present disclosure will be described with reference to the drawings. FIG. 1 is a schematic configuration diagram of a battery electric vehicle 10 according to an embodiment of the present disclosure. As illustrated, the battery electric vehicle 10 of the embodiment includes a battery 12 as an energy storage device, a motor 20, first and second inverters 22 and 24, first and second capacitors 30, 32, a cathode switch 34p and an anode switch 34n as switches, and an electronic control unit (hereinafter referred to as "ECU") 50 as a controller.

The battery 12 is configured as, for example, a lithium-ion secondary battery or a nickel-hydrogen secondary battery, and is connected to the power line 28 (cathode line 28p and anode line 28n). The motor 20 is configured as a three-phase AC motor, and includes a rotor in which a permanent magnet is embedded in a rotor core, and a stator in which three-phase (U-phase, V-phase, and W-phase) coils (three-phase open-end winding) are wound around the stator core. The rotor is connected to a drive shaft connected to the drive wheels via a differential gear.

The first and second inverters 22 each include six transistors T11 to T16, T21 to T26 as a plurality of switching devices, and six diodes D11 to D16, D21 to D26 respectively connected in parallel with the six transistors T11 to T16, T21 to T26. For example, MOSFETs or IGBTs are used as the transistors T11 to T16, T21 to T26. The transistors T11 to T16, T21 to T26 are provided in pairs so as to be a source and a sink with respect to the cathode line 28p and the anode line 28n. Each of the connecting points of the pairs of transistors T11 to T16 is connected to a corresponding one of first ends of the three-phase coils of the motor 20. Each of the connecting points of the pairs of transistors T21 to T26 is connected to a corresponding one of second ends of the three-phase coils of the motor 20. Hereinafter, the transistors T11 to T13 are sometimes referred to as "first upper arm," the transistors T14 to T16 are sometimes referred to as "first lower arm," the transistors T21 to T23 are sometimes referred to as "second upper arm," and the transistors T24 to T26 are sometimes referred to as "second lower arm."

The first and second capacitors 30, 32 are connected to the power line 28 at positions near the first and second inverters 22, 24, respectively. In the embodiment, the battery 12, the first capacitor 30, the first inverter 22, the second inverter 24, and the second capacitor 32 are connected to the power line 28 in this order from the left in FIG. 1. The cathode switch 34p and the anode switch 34n are provided between the first and second inverters 22, 24 of the cathode line 28p and the anode line 28n, respectively. For example, semiconductor switches or insulated switches are used as the cathode switch 34p and the anode switch 34n.

The ECU 50 includes: a microcomputer including a CPU, an ROM, an RAM, a flash memory, input and output ports, and a communication port; various drive circuits; and various logic ICs. The ECU 50 receives signals from various sensors. For example, the ECU 50 receives the voltage Vb of the battery 12 from a voltage sensor 12v, the current Ib of the battery 12 from a current sensor 12i, and the temperature Tb of the battery 12 from a temperature sensor 12t. The ECU 50 also receives the rotational position θm of the rotor of the motor 20 from a rotational position sensor 20a and the phase currents Iu, Iv, Iw of each phase of the motor 20 from current sensors 20u, 20v, 20w. The ECU 50 also receives the voltage VH of the first capacitor 30 from a voltage sensor 30v and the voltage VL of the second capacitor 32 from a voltage sensor 32v. The ECU 50 also receives an on-off signal from a power switch 60, a shift position SP that is an operating position of the shift lever 61 from a shift position sensor 62, and an accelerator operation amount Acc that is an amount of depression of the accelerator pedal 63 from an accelerator pedal position sensor 64. The ECU 50 also receives a brake pedal position BP that represents an amount of depression of the brake pedal 65 from a brake pedal position sensor 66, and a vehicle speed V from a vehicle speed sensor 67.

The ECU 50 outputs various control signals. For example, the ECU 50 outputs control signals for the transistors T11 to T16 of the first inverter 22, the transistors T21 to T26 of the second inverter 24, the cathode switch 34p, and the anode switch 34n. The ECU 50 calculates the state of charge SOC of the battery 12 based on the accumulated value of the current Ib of the battery 12, and calculates the electrical angle θe and the rotational speed Nm of the motor 20 based on the rotational position θm of the rotor of the motor 20.

In battery electric vehicle 10 of the embodiment, the ECU 50 sets requested torque Td* requested for traveling based on the accelerator operation amount Acc and the vehicle speed V, and sets a torque command Tm* for the motor 20 such that the vehicle travels with the set requested torque Td*. Then, the ECU 50 controls the first and second inverters 22, 24, the cathode switch 34p, and the anode switch 34n in a Y-drive mode or an H-drive mode based on the set torque command Tm*. In the Y-drive mode, the cathode switch 34p and the anode switch 34n are turned off, and one of the second upper arm (transistors T21 to T23) and the second lower arm (transistors T24 to T26) of the second inverter 24 is turned on, and the other is turned off. The first inverter 22 (transistors T11 to T16) is driven to perform switching. In this case, the neutral point of the motor 20 is formed by the second inverter 24. In the H-drive mode, the cathode switch 34p and the anode switch 34n are turned on, and the first and second inverters 22, 24 (transistors T11 to T16, T21 to T26) are driven to perform switching.

Figure 2:
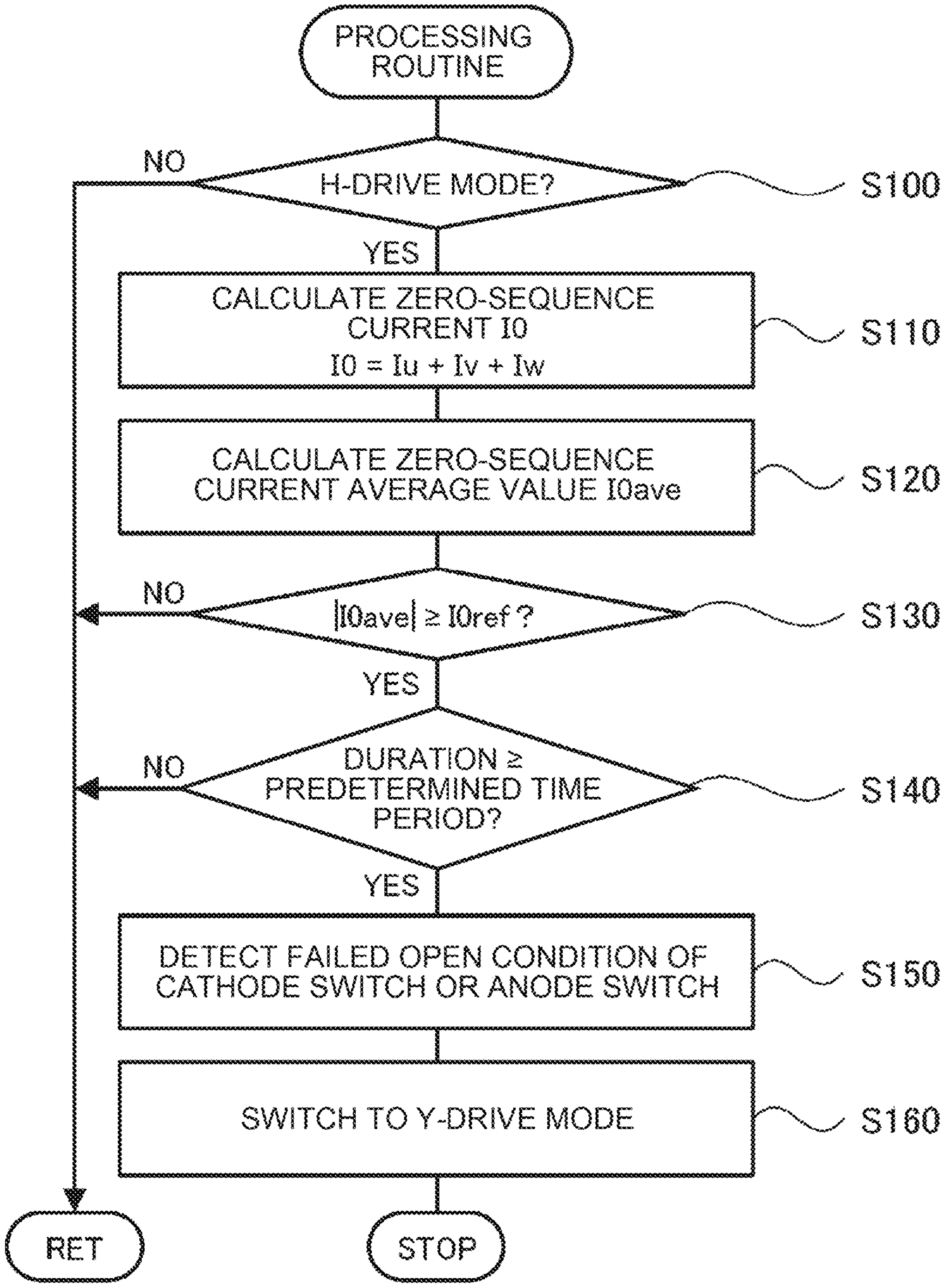
FIG. 2 is a flowchart illustrating an example of a processing routine that is executed by an ECU.

Next, the operation of the battery electric vehicle 10 of the embodiment will be described. In particular, an operation when the cathode switch 34p or the anode switch 34n has failed open will be described. FIG. 2 is a flowchart illustrating an example of a process routine that is executed by the ECU 50. This routine is repeatedly executed when a failed open condition of the cathode switch 34p or the anode switch 34n has not been detected.

When the routine is executed, the ECU 50 first determines whether the drive mode is the H-drive mode or the Y-drive mode (S100). When it is determined that the drive mode is the Y-drive mode, the routine ends. This is because the cathode switch 34p and the anode switch 34n are turned off in the Y-drive mode.

When it is determined in S100 that the drive mode is the H-drive mode, the ECU 50 calculates a zero-sequence current I0 that is the sum of the phase currents Iu, Iv, Iw of each phase of the motor 20 from the current sensors 20u, 20v, 20w (S110). The ECU 50 then calculates a zero-sequence current average value I0ave that is an average value of the zero-sequence current I0 over a predetermined time period T1 (S120). The predetermined time period T1 is determined in advance by experimentation, analysis, etc.

Once the zero-sequence current average value I0ave is calculated, the ECU 50 determines whether the absolute value of the zero-sequence current average value I0ave is equal to or larger than a threshold I0ref (S130). When the absolute value of the zero-sequence current average value I0ave is equal to or larger than the threshold I0ref, the ECU 50 determines whether its duration is equal to or longer than a predetermined time period T2 (S140). The threshold I0ref is a threshold used to determine whether the cathode switch 34p or the anode switch 34n has failed open. The predetermined time period T2 is the amount of time it takes to confirm that the cathode switch 34p or the anode switch 34n has failed open. The threshold I0ref and the predetermined time period T2 are determined in advance by experimentation, analysis, etc. When both the cathode switch 34p and the anode switch 34n are properly on in the H-drive mode, a current is allowed to flow through the cathode line 28_p_ and the anode line 28_n_. Therefore, the absolute value of the zero-sequence current I0 is unlikely to increase. On the other hand, when the cathode switch 34_p_ or the anode switch 34_n_ has failed open in the H-drive mode, a current is not allowed to flow through the cathode line 28_p_ or the anode line 28_n_. Therefore, the absolute value of the zero-sequence current I0 may become relatively large. The inventors confirmed this by experiments, analysis, etc. The process of S130, S140 is a process based on this.

When it is determined in S130 that the absolute value of the zero-sequence current average value I0ave is less than the threshold I0ref, the ECU 50 determines that both the cathode switch 34_p_ and the anode switch 34_n_ are properly on (neither of the switches have failed open), and the routine ends.

When it is determined in S130 the absolute value of the zero-sequence current average value I0ave is equal to or larger than the threshold I0ref and it is determined in S140 that its duration is less than the predetermined time period T2, the ECU 50 ends the routine without detecting (determining) a failed open condition of the cathode switch 34_p_ or the anode switch 34_n_.

When it is determined in S130 that the absolute value of the zero-sequence current average value I0ave is equal to or greater than the threshold I0ref and it is determined in S140 that its duration is equal to or longer than the predetermined time period T2, the ECU 50 detects (determines) a failed open condition of the cathode switch 34_p_ or the anode switch 34_n_ (S150). In this case, the drive mode is switched from the H-drive mode to the Y-drive mode (S160), and the routine ends. It is possible to detect a failed open condition of the cathode switch 34_p_ or the anode switch 34_n_ in this manner. In the Y-drive mode, the cathode switch 34_p_ and the anode switch 34_n_ are turned off, and the battery electric vehicle therefore can travel in a limp home mode even when either the cathode switch 34_p_ or the anode switch 34_n_ has failed open.

Figure 3:
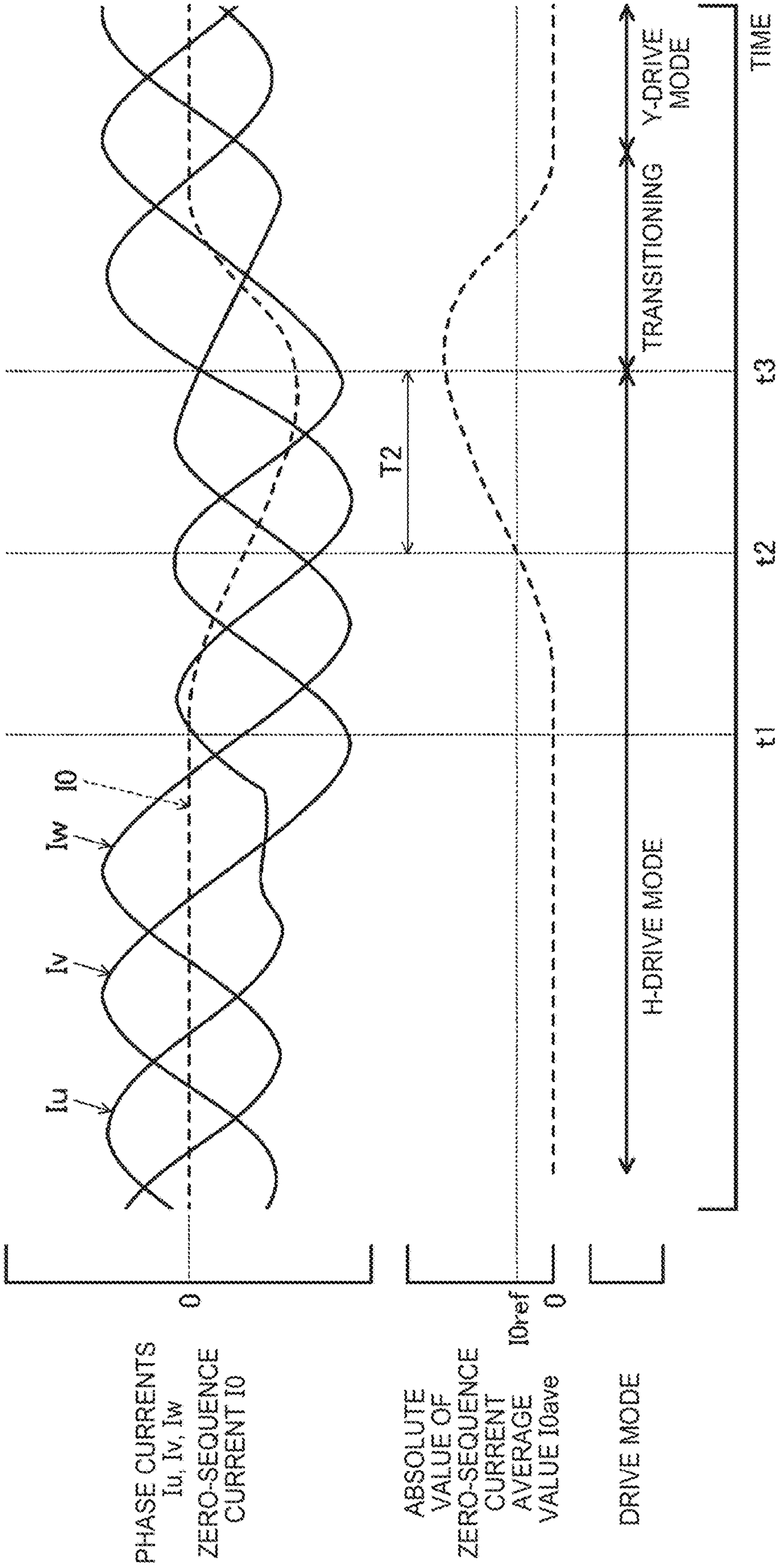
FIG. 3 illustrates an example of when the cathode switch has failed open.

FIG. 3 illustrates an example in which the cathode switch 34_p_ has failed open. As shown in the figure, after the cathode switch 34_p_ has failed open at time t1, the absolute value of the zero-sequence current average value I0ave reaches the threshold I0ref or more at time t2. When its duration reaches the predetermined time period T2 or more at time t3, the failed open condition of the cathode switch 34_p_ or the anode switch 34_n_ is detected. Then, the drive mode is shifted from the H-drive mode to the Y-drive mode. It is thus possible to detect a failed open condition of the cathode switch 34_p_ or the anode switch 34_n_ and then allows the battery electric vehicle to travel in the limp home mode.

In the battery electric vehicle 10 of the above embodiment, when the absolute value of the zero-sequence current average value I0ave reaches the threshold I0ref or more and its duration reaches the predetermined time period T2 or more in the H-drive mode, a failed open condition of the cathode switch 34_p_ or the anode switch 34_n_ is detected. It is possible to detect a failed open condition of the cathode switch 34_p_ or the anode switch 34_n_ in this manner. When a failed open condition of the cathode switch 34_p_ or the anode switch 34_n_ is detected, the drive mode is shifted from the H-drive mode to the Y-drive mode. This allows the vehicle to travel in the limp home mode.

In the above embodiment, a failed open condition of the cathode switch 34_p_ or the anode switch 34_n_ is detected when the absolute value of the zero-sequence current average value I0ave reaches the threshold I0ref or more and its duration reaches the predetermined time period T2 or more. However, the present disclosure is not limited to this. For example, a failed open condition of the cathode switch 34_p_ or the anode switch 34_n_ may be detected when the absolute value of the zero-sequence current average value I0ave reaches the threshold I0ref or more and its duration reaches the predetermined time period T2 or more.

Figure 4:
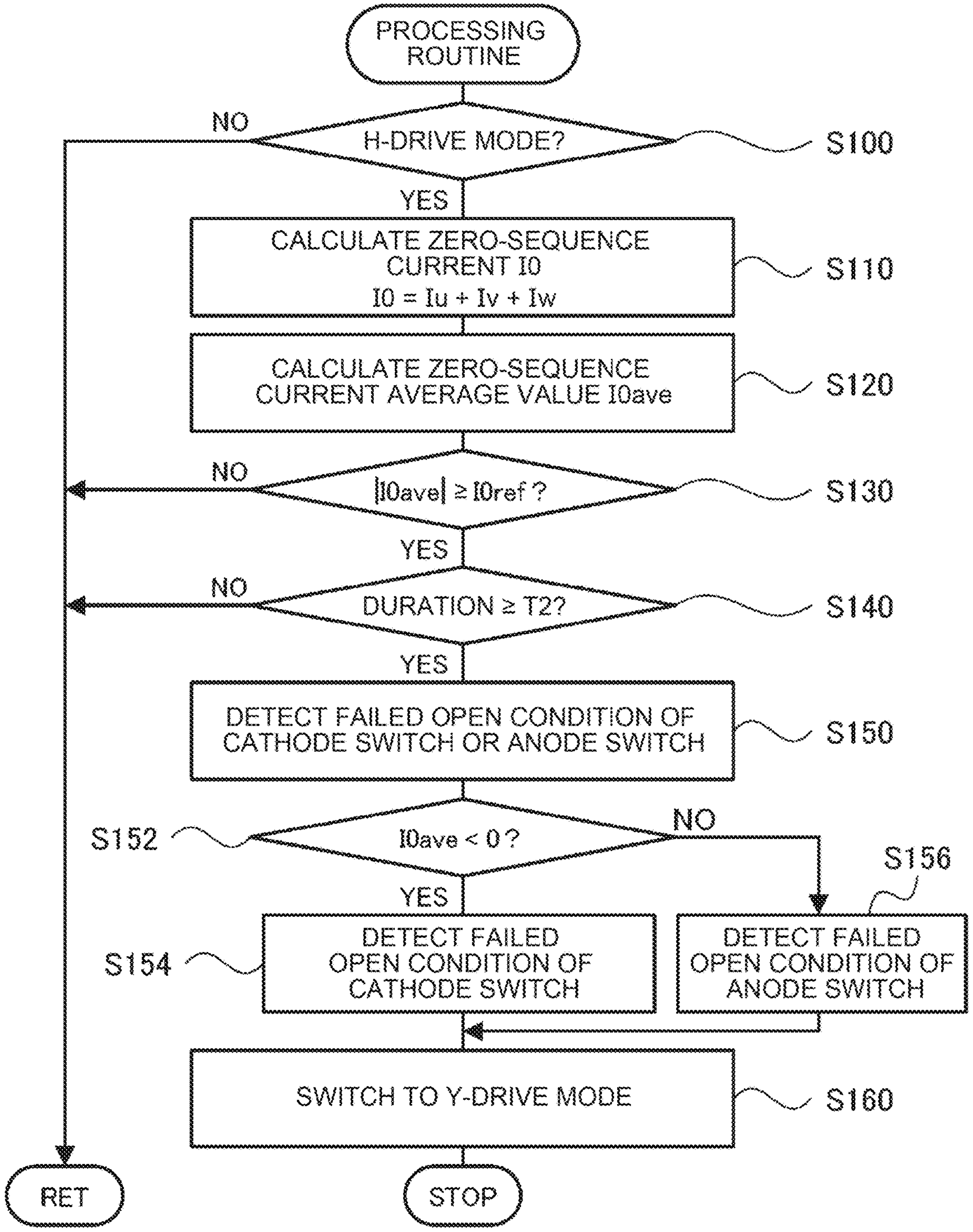
FIG. 4 is a flowchart illustrating an example of a processing routine according to a modification.

In the above embodiment, the ECU 50 executes the processing routine in FIG. 2. However, instead of this, the ECU 50 may execute the processing routine in FIG. 4. The processing routine in FIG. 4 is different from the processing routine in FIG. 2 in that S152 to S156 are added. Therefore, in the processing routine in FIG. 4, the same steps as those of the processing routine in FIG. 2 are denoted by the same step numbers, and detailed description thereof will be omitted.

In the processing routine in FIG. 4, the ECU 50 checks the sign of the zero-sequence current average value I0ave in response to detection of a failed open condition of the cathode switch 34_p_ or the anode switch 34_n_ in S150 (S152). This is because the sign of the zero-sequence current average value I0ave is different between when the cathode switch 34_p_ has failed open and when the anode switch 34_n_ has failed open. When it is determined that the sign of the zero-sequence current average value I0ave is negative, it is determined that the cathode switch 34_p_ has failed open (S154), and the process proceeds to S160. On the other hand, when it is determined that the sign of the zero-sequence current average value I0ave is positive, it is determined that the anode switch 34_n_ has failed open (S156), and the process proceeds to S160. It is possible to determine which of the cathode switch 34_p_ and the anode switch 34_n_ has failed open by this process.

In the above embodiment, the battery electric vehicle 10 includes the cathode switch 34_p_ and the anode switch 34_n_. However, the present disclosure is not limited to this. For example, the battery electric vehicle may include either the cathode switch 34_p_ or the anode switch 34_n_.

In the above embodiment, the battery electric vehicle 10 includes the battery 12, the motor 20, and the first and second inverters 22, 24. However, the present disclosure is not limited to this. For example, the present disclosure may be a hybrid electric vehicle that further includes an engine in addition to the same hardware configurations as those of the battery electric vehicle 10. The present disclosure may be a fuel cell electric vehicle that further includes a fuel cell in addition to the same hardware configurations as those of the battery electric vehicle 10.

The correspondence between the main elements of the embodiments and the main elements of the disclosure described in the section of the means for solving the problem will be described. In the embodiment, the battery 12 corresponds to the "energy storage device," the motor 20 corresponds to the "motor," the first inverter 22 corresponds to the "first inverter," and the second inverter 24 corresponds to the "second inverter." The cathode switch 34_p_ and the anode switch 34_n_ correspond to the "switch," and the ECU 50 corresponds to the "controller." The cathode switch 34_p_ corresponds to the "cathode switch," and the anode switch 34_n_ corresponds to the "anode switch."

The correspondence between the main elements of the embodiment and the main elements of the disclosure described in the section of the means for solving the problem is an example for specifically explaining the embodiment of the disclosure described in the section of the means for solving the problem. Therefore, the elements of the disclosure described in the section of the means for solving the problem are not limited. That is, the interpretation of the disclosure described in the section of the means for solving the problem should be performed based on the description in the section, and the embodiments are merely specific examples of the disclosure described in the section of the means for solving the problem.

Hereinafter, while embodiments for carrying out the present disclosure are described by using embodiments, it is needless to say that the present disclosure is not limited to such embodiments, and can be implemented in various forms without departing from the gist of the present disclosure.

The present disclosure is applicable to the manufacturing industry of electrified vehicles etc.

What is claimed is:

1. An electrified vehicle including an energy storage device, a traction motor including a three-phase open-end winding, a first inverter including a first upper arm and a first lower arm, the first inverter being connected to a power line to which the energy storage device is connected, and being connected to a first end of the three-phase open-end winding, a second inverter including a second upper arm and a second lower arm, the second inverter being connected to the power line at a position on an opposite side of the first inverter from the energy storage device, and being connected to a second end of the three-phase open-end winding, a switch provided on the power line at a position between the first inverter and the second inverter, and a controller configured to control the first inverter, the second inverter, and the switch, wherein the controller is configured to determine that the switch has failed open, when the controller confirms that an absolute value of a zero-sequence current is equal to or greater than a threshold while the switch is on and the first inverter and the second inverter are being driven to perform switching, the zero-sequence current being a sum of phase currents of three phases.

2. The electrified vehicle according to claim 1, wherein the controller is configured to, when the controller determines that the switch has failed open, turn on one of the second upper arm and the second lower arm, turn off the other, and drive the first inverter to cause the first inverter to perform the switching.

3. The electrified vehicle according to claim 1, wherein:

the switch includes a cathode switch and an anode switch, the cathode switch being provided on a cathode line of the power line at a position between the first inverter and the second inverter, and the anode switch being provided on an anode line of the power line at a position between the first inverter and the second inverter; and the controller is configured to, when the controller determines that the switch has failed open, determine, based on a sign of the zero-sequence current, which of the cathode switch and the anode switch has failed open.

* * * * *